April 22, 1969     C. P. CARDEIRO     3,440,525
pH METER AND CONTROL SYSTEM
Filed April 13, 1966     Sheet 2 of 2
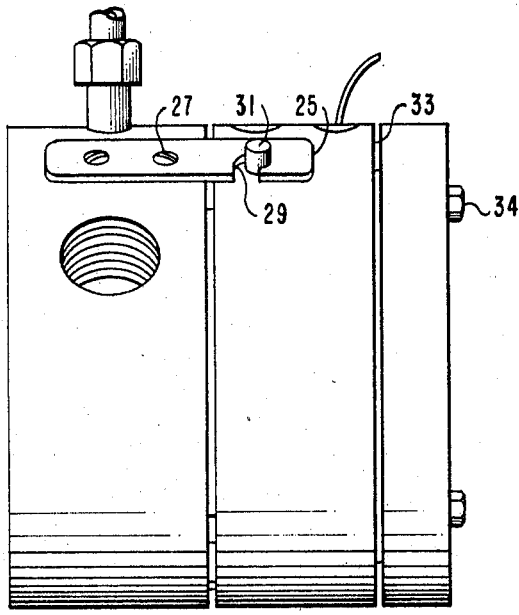
FIG. —3
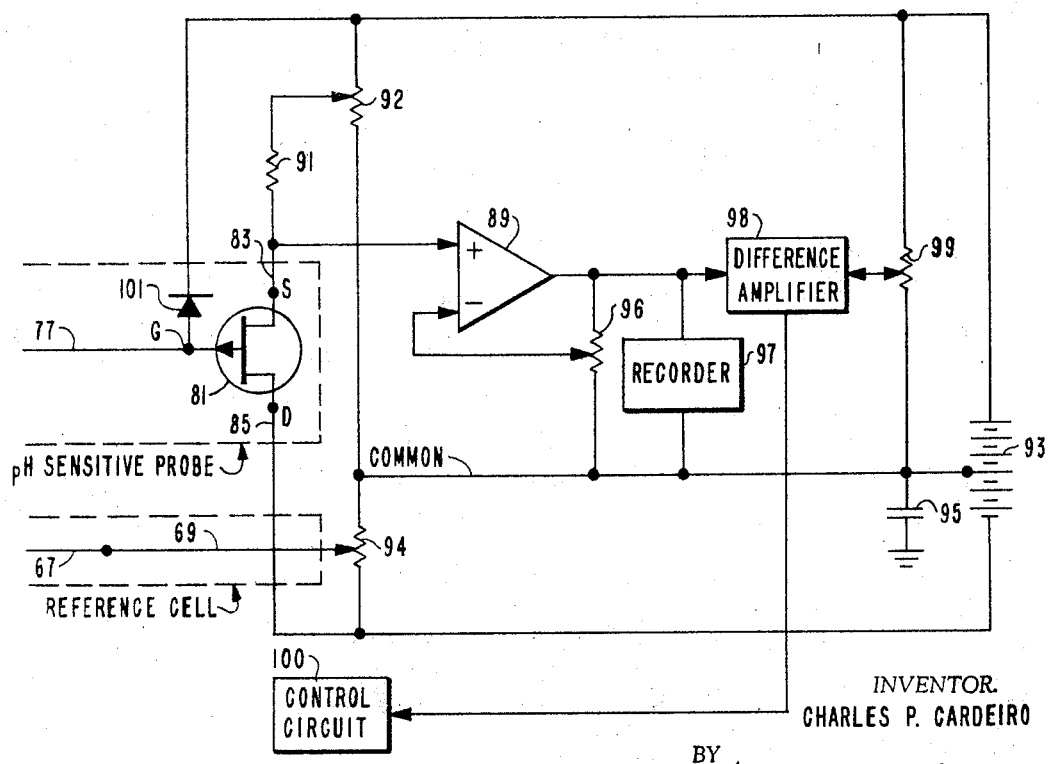
FIG. —4
INVENTOR.
CHARLES P. CARDEIRO
BY Fraser and Bogucki
ATTORNEYS United States Patent Office 3,440,525
Patented Apr. 22, 1969

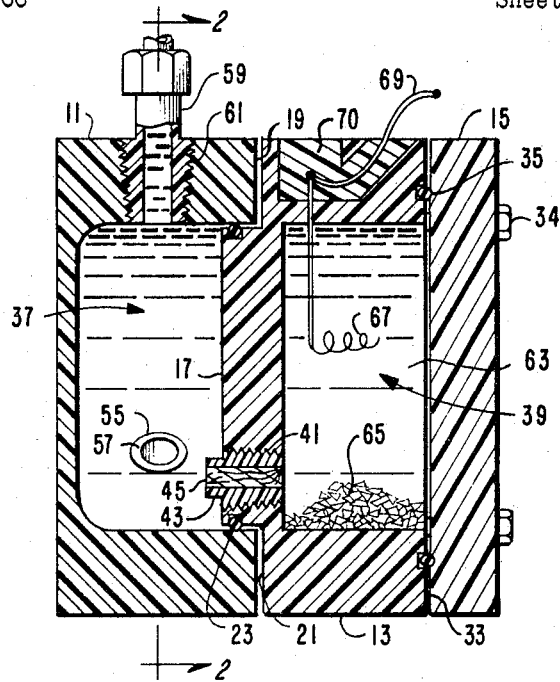
FIG. — 1
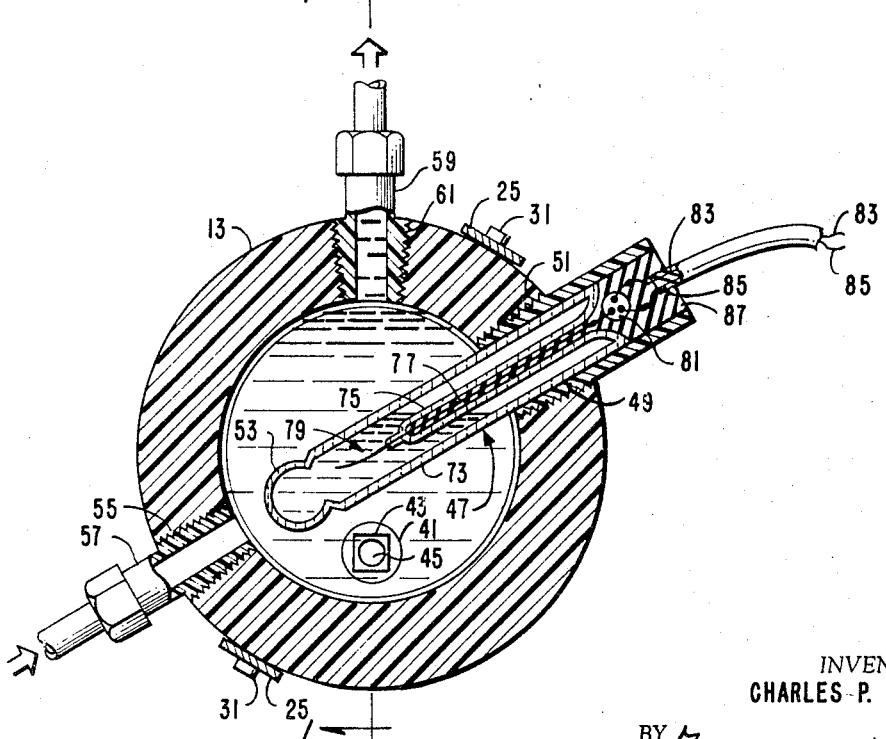
FIG. — 2
INVENTOR.
CHARLES P. CARDEIRO

3,440,525
pH METER AND CONTROL SYSTEM
Charles P. Cardeiro, Santa Ana, Calif., assignor, by mesne assignments, to Universal Interloc, Inc., Trevose, Pa., a corporation of Pennsylvania
Filed Apr. 13, 1966, Ser. No. 542,351
Int. Cl. G01r *11/44, 1/30;* H03f *3/14*
U.S. Cl. 324—30     15 Claims

ABSTRACT OF THE DISCLOSURE

The pH sensitive electrode has a field effect transistor (FET) mounted on or in close proximity to the probe structure with its gate terminal connected to the internal conductor of the electrode to transmit a low impedance output indicative of pH to a remote location. The reference half cell employs a sealed chamber containing a substantial excess of undissolved salt crystals immersed in a saturated salt bridge solution that communicates through a liquid junction device, such as a wooden dowel or porous ceramic plug, having substantial cross sectional area to provide numerous capillaries extending between the chamber and the test solution.

---

This invention relates to an improved pH metering system for monitoring and controlling pH, and more particularly to a unique pH sensitive probe assembly and meter arrangement for continuously measuring and controlling pH with maximum reliability and minimum drift.

Potentiometric pH meters consist of a pH responsive electrode of a material such as silicon, glass or antimony, the potential of which depends upon the hydrogen ion activity of the surrounding solution, a reference electrode the potential of which is independent of the composition of the solution at any given temperature, for determining the potential of the solution, and a device such as a voltmeter for measuring the potential difference between the two electrodes. Within certain limits, the voltage measured between the electrodes is proportional to the existing pH, and the voltmeter scale can, for convenience, be calibrated directly in pH units. The voltage developed between the electrodes can also conveniently be used to actuate control mechanisms or recorders for automatically controlling chemical processes or regulating chemical concentrations in various systems. However, for continuous monitoring, recording and controlling applications, the pH meter should operate for substantial time periods with negligible drift with time and without errors resulting from temperature variations and other special problems pertaining to calibrations, humidity variations and to connections between the electrodes and remote metering of control circuits.

Present day pH meters intended for continuous recording or control application for the most part require frequent maintenance and calibration to minimize errors due to drift. Drift in pH meters is primarily attributable to the nature of the pH sensitive and reference electrodes used in sensing pH. The pH sensitive electrode usually consists of a tubular probe with a special pH sensitive glass diaphragm sealing one end and an aqueous solution of neutral electrolytic salt, usually potassium chloride (KCl), contained within the hollow interior of the probe to serve as an electrical bridge between the diaphragm and an internal conductor. Likewise, the reference electrode contains an interior conductor also immersed in an electrolytic salt bridge solution, usually potassium chloride, enclosed in a hollow cell structure. In the reference electrode, the salt bridge solution maintains an ion contact with the solution of unknown pH through a liquid junction device, such as a small capilalry tube or asbestos fiber. The voltage difference between the electrodes is measured by coupling the interior conductors to the metering or recording device. In both the pH sensitive and reference electrodes, the interior conductors are made of calomel or silver-silver chloride, materials that exhibit constant known oxidation-reduction potentials in electrolytic solutions of predetermined concentration and constant temperature. Thus, if the same internal conductor materials are used with the same electrolyte in both electrodes, and the same temperatures and salt concentrations are maintained in both, then, in measuring the potential between electrodes to determine pH, the oxidation-reduction potentials at the respective interior conductors should exactly cancel one another.

However, one of the priamry sources of drift in present day pH meters results from the inability to maintain equal electrolytic salt concentrations within both electrodes. Salt is inevitably lost through the liquid junction device, thus gradually reducing the concentration of the salt bridge solution in the reference electrode and causing a change in the oxidation-reduction potential of the interior conductor. In the past, efforts have been made to reduce the resulting drift by providing large liquid reservoirs of the salt bridge solution within the reference electrodes so that the effect of the gradual loss of salt through the liquid junction is reduced. However, even then, frequent calibartion is required for accuracy, and frequent periodic recharging of the reservoir is necessary to replace the depleted salt bridge solution with a new solution of known concentration.

Probably the most serious problems encountered in the continuous recording and control of pH result from the extremely high impedance of pH responsive materials and changes in this impedance. The resistance of most pH sensitive glasses is halved with each temperature increase of only six or seven degrees centigrade, and a typical glass electrode may have an internal impedance of from ten to five hundred megohms. As a result of this extremely high impedance, the leads connecting the pH sensitive electrode to the meter or recorder device tend to act as an antenna to pick up stray electromagnetic and electrostatic fields, thus causing considerable voltage fluctuations at the metering device. The high internal impedance of the electrode also requires that the metering or control device itself employ higher input impedance circuitry to avoid loading the pH sensitive electrode, and such high impedance circuits are notoriously subject to drift problems. In addition, special insulation is required between the leads to prevent current leakage and loading errors which are particularly troublesome under humid conditions. For these reasons, specially constructed cables must frequently be employed to shield and insulate the leads, and desiccants are often used to exclude moisture. But even with these precautions, the practical limit of the cable length for a glass electrode of one hundred megohms internal impedance may only be about five or six feet. Beyond this length, noise pickup and leakage resistance make accurate pH measurements impossible, and the capacitance developed between the leads is sufficiently large to result in long time constants that significantly delay the response of the pH meter to actual changes in pH. Moreover, the high impedance limits use of conventional multiplexing and switching techniques whereby a single meter or recorder might monitor pH at separate locations, since switching transients are not dissipated in the high impedance circuits.

Therefore, it is an object of the present invention to provide an improved pH meter system for continuously monitoring or controlling chemical processes and concentrations.

Another object of the present invention is to provide an improved pH meter which is capable of operating over prolonged periods with minimum drift and minimum error due to temperature and other environmental changes.

A further object of the present invention is to provide an improved pH metering system having a unique reference electrode that does not require a large reservoir of electrolytic bridge solution or frequent calibration or maintenance.

A still further object of the present invention is to provide an improved pH meter system having an unique pH sensitive electrode that permits a relatively low impedance to be maintained across the leads connecting the electrodes to a remote metering or recording device, and permits a single meter or recorder to be used for monitoring pH at multiple remote locations.

Yet another object of the present invention is to provide an improved pH metering control system requiring infrequent maintenance for continuously and accurately measuring or controlling chemical processes or concentrations in circulating solutions.

These and other objects are accomplished in accordance with the invention by providing a unique arrangement consisting of a pH sensitive electrode having a preamplifier circuit with a field effect transistor located within or in close proximity to the electrode structure and of a reference electrode with a liquid junction device that permits the salt bridge solution to be maintained constantly saturated by a supply of undissolved crystalline salt.

In a preferred embodiment, the internal conductor of the pH sensitive electrode is connected to the gate terminal of the field effect transistor which is within the body of the electrode, and operates as the active element of a preamplifier circuit and has an extremely high input impedance at its gate terminal, typically on the order of $10^{12}$ ohms, but provides a relatively low output impedance of only a few thousand ohms across its drain and source terminals which are connected by output leads to appropriate metering or control circuitry. The relatively low output impedance effectively eliminates the necessity for special cable arrangements to shield and insulate the output leads, and thus permits remote connections to metering or control circuitry located at a considerable distance from the electrodes without problems of severe noise disturbance or current leakage error, even in the presence of strong stray fields and high humidity conditions. In addition, the effects of temperature variation on the pH measurement are minimized in that the field effect transistor is subject to the same temperature variations as those encountered by the pH sensitive material. Since the input signal current drawn by the gate terminal of the field effect transistor changes with temperature at a rate approximately equal, but opposite in sense to the change in the internal impedance of the pH sensitive material, the natural tendency for the pH reading to drift with temperature change due to the resistance change of the pH sensitive material is to a great extent automatically compensated.

In accordance with another aspect of the invention, the reference electrode has a wooden or a porous ceramic plug with substantial cross-sectional area forming the liquid junction device between the internal salt bridge solution and the solution of unknown pH. This type of liquid junction device provides numerous small capillary structures over a substantial area through which ion exchange is maintained between solutions. Previously, the liquid junction devices for the reference electrode consisted of individual minute capillaries, typically a capillary tube or asbestos fiber, so that the salt concentration in the bridge solution had to be maintained at or below saturation to prevent undissolved crystals from completely obstructing the liquid junction. However, with larger area of wooden or ceramic liquid junction devices contemplated by this invention, it is virtually impossible for crystalline salt to clog all the numerous capillaries at one time so that the reference electrode can be filled with an excess of crystalline salt over that amount needed for saturation. The undissolved salt crystals are then available to maintain the salt bridge solution fully saturated as dissolved salt is lost through the liquid. Thus, the oxidation-reduction potential of the internal conductor in the salt bridge solution remains substantially constant over prolonged periods of operation without the necessity for frequent recharging or for providing a large reservoir of salt bridge solution for the reference cell.

These and other aspects of the invention can be better understood by reference to the following detailed description taken in conjunction with the accompanying drawings, in which:

FIGURE 1 is a full sectional side view of a flow cell for use in a pH meter system in accordance with the invention, taken along the line 1—1 of FIG. 2, the pH sensitive electrode having been omitted for simplicity of illustration;

FIGURE 2 is a full transverse cross-sectional view of the flow cell with the pH sensitive electrode included therein, taken along the line 2—2 of FIG. 1; FIG. 1 for use in the system in accordance with this invention;

FIGURE 3 is a full side view of the flow cell shown in FIGS. 1 and 2; and

FIGURE 4 is a schematic circuit diagram partially in block diagram form illustrating a single ended amplifier arrangement for use in accordance with the invention for continuously measuring and controlling pH.

Referring now to FIGS. 1, 2 and 3, which show a preferred form of pH meter arrangement in accordance with the invention, a cylindrical housing for a flow cell type pH meter is constructed by joining three cylindrically shaped members 11, 13 and 15. The outer member 11 has a hollow cup shape with an open end that fits snugly over a boss 17 extending outward from the closed end of the center member 13. The open end of the cup shaped member 11 is formed with a surrounding flat annular surface 19 adjacent a flat annular flange 21 surrounding the boss 17. An O-ring 23 fits into a radial groove around the boss 17 to provide a leak proof seal between the surrounding inner radial surface of the member 11 and the outer radial surface of the boss 17. Elongated bracket members 25 are affixed by screws 27 at one end to the outer radial surface of the cup shaped member 11, and each has a key shaped slot 29 formed at its other end to engage a dowel 31 that protrudes from the outer radial surface of the center member 13. Thus the outer member 11 is easily attached or detached from the center member 13 with a slight turning motion that moves the dowels 31 into or out of the key shaped slots 29. The center member 13 also has a cup shaped hollow interior, the open end of which is surrounded by a flat annular surface 33. The member 15 is a flat circular plate that is attached to the open end of the center member 13 by screws 34. An O-ring 35 disposed in an annular groove on the surface 33 surrounding the open end of the cup provides a leak proof closure against the abutting surface of the plate member 15. The assembled housing thus defines two separate hollow cylindrically shaped chambers 37 and 39, which are connected through an aperture 41 that extends through the closed end of the center member 13 at the lower edge of the boss 17. The connecting aperture has a threaded bore that receives an externally threaded plug 43 having an inner core 45 of wood or porous ceramic material which acts as a liquid junction between the chambers 37 and 39.

A pH sensitive probe 47 having a threaded collar 49 at its base is inserted through an opening 51 in the peripheral outer wall of the member 11 to extend radially inward within the chamber 37 so that the tip of the probe, which is a pH sensitive glass diaphragm 53, is directly opposite a flow inlet aperture 55 to which an inlet fitting 57 is attached. The radial axes of the apertures 51 and 55, and the probe 47, are aligned along a single diameter through the center of the cylindrical chamber 37 at an angle of about 30° to the horizontal. The solution of unknown pH, usually flowing at a constant rate from the outlet of a sample pump (not shown), emerges from the inlet fitting 57 and inlet aperture 55 into the chamber 37 in an upward stream to impinge directly upon the pH sensitive glass diaphragm 53 at the tip of the downwardly extending probe 47. This provides a self-cleaning feature to keep the outer surface of the pH sensitive glass diaphragm 53 relatively free of deposits that might impair its accuracy and sensitivity. The solution flowing into the chamber 37 eventually exits through an outlet fitting 59 coupled to an outlet aperture 61 formed in the peripheral outer wall of the member 11 at the top of the chamber 37.

The chamber 39 encloses the reference half cell for measuring the existing potential of the solution of unknown pH flowing through the chamber 37. The chamber 39 contains a fully saturated salt bridge solution 63 consisting of crystalline potassium chloride dissolved in distilled water. The chamber 39 is initially filled with a large amount of crystalline potassium chloride in excess of that needed for providing a fully saturated solution so that a substantial quantity of undissolved crystals 65 are available to maintain the solution fully saturated over long periods of continued use during which salt gradually escapes through the liquid junction core 45. In practical embodiments of the invention, the reference cell need only be recharged after six months or longer of continuous operation, and throughout this period the salt bridge solution 63 is maintained fully saturated. A thin silver-silver chloride wire 67, or calomel electrode, if desired, extends downward through a small hole in the top of the chamber 39 into the salt bridge solution 63. The upper end of the thin wire 67 extends from the small hole into a recess formed in the outer peripheral chamber wall of the member 13, where it is connected to an output lead 69 which is coupled to the external metering or control circuitry as hereinafter more fully described. After the connection is made, the recess is filled with an appropriate insulating potting material 70 that holds the wire 67 and the output lead 69 in place and seals the space around the hole to prevent leaks.

The solution of unknown pH flowing into the chamber 37 comes in contact with one end of the liquid junction core 45, while the other end of the core 45 is in contact with the salt bridge solution 63 within the chamber 39. A wooden core 45, as depicted in the drawing, may consist of a piece of dried lumber cut or otherwise formed to the appropriate size and shape to fit snugly within the plug 43. Precut hardwood dowels with a quarter inch diameter have proved excellent for this purpose. For best results, the longitudinal axis of the wood core 45 should be aligned with the longitudinal axis of the capillary structures, that is, parallel to the grain of the wood. Throughout its length, the wooden core should be relatively free of knots and other imperfections that distort the alignment or decrease the number of the capillary cells per unit of cross-sectional area. Initially, the dried piece of wood can be inserted into place within the hole provided in the plug 43, and then, as liquid permeates the wood, the core swells to give a tight seal.

Wooden cores, however, tend to deteriorate with prolonged immersion and are subject to attack by certain chemicals, particularly certain acid and base solutions, which actually dissolve important chemical constituents of wood. Where the nature of the solution of unknown pH prevents the use of wood, or where a more durable liquid junction device is desired, the liquid junction core 45 can be made of a suitable porous ceramic material, various kinds of which are commercially available. In a preferred form, the core consists of a solid cylinder of commercially available porous alumina ($AlO_2$) material one quarter inch in diameter. Other suitable porous ceramic materials for making the liquid junction cores are described in U.S. Patent No. 2,925,370, issued Feb. 16, 1960, to D. A. Rohrer, with the cores made from each of these materials being roughly one quarter inch in diameter.

In previously pH electrodes, where the liquid junction device usually consisted of a single small capillary, the presence of undissolved crystalline salt in the bridge solution could easily result in a complete obstruction of the liquid junction. A single salt crystal could completely cover the small capillary opening thus preventing the necessary contact between the solutions. However, the relatively large cross-sectional area of the wooden and ceramic cores contemplated by this invention makes it virtually impossible for salt crystals to block all of the capillaries cooperating to form the liquid junction.

The members 11, 13 and 15 forming the housing, and their associated fittings in contact with the solutions, consist of suitable nonconductive materials, such as polyvinyl chloride plastics or nylon, which are chemically inert with respect to the solutions. The various plastic and nylon pieces are easily molded or machined. It should be noted that the various apertures, and the respective fittings inserted therein, are slightly tapered to insure a substantially leak-proof seal between the threads.

Unlike most precision pH meters, it should be noted that no attempt is made in the reference half cell to maintain a differential head pressure or apply external pressure to insure an outward flow of the salt bridge solution through the liquid junction device. Although a continuous outflow may be desirable in some applications, and can easily be implemented, most continuous control applications, particularly those involving control of the pH in recirculating water systems of the cooling tower type, do not require continuous outflow. It has been found that, so long as the salt bridge solution is maintained fully saturated, the introduction of relatively small amounts of impurities through the liquid junction into the salt bridge solution has little if any effect on the accuracy of the pH measurement.

Referring again to FIG. 2, which shows the interior details of the pH sensitive electrode, the pH sensitive glass diaphragm 53, which is made of a very thin specially treated glass, is hermetically sealed to the lower end of a tubular untreated glass stem 73 that forms the body of the probe and serves as an insulator. The tubular glass stem 73 is formed with an elongated narrow glass tube 75 extending downward from the top a substantial distance into its hollow interior. A thin silver-silver chloride electrode wire forms the internal conductor 77 (or calomel if the electrode in the reference cell is also calomel) extends downward through the hollow interior of the narrow tube 75 and beyond its tip into the enclosed space within the lower portion of the stem 73. The tip of the narrow glass tube 75 is hermetically sealed around the wire forming the internal conductor 77, and the length of the wire extending beyond the tip is coated with silver chloride. A saturated electrolytic salt solution, the same as that used in the reference half cell, that is, potassium chloride salt in distilled water, fills the interior of the diaphragm 53 and the stem 73 to a level where the coated portion of the wire conductor 77 extending beyond the tip of the tube 75 is immersed. For best results, the salt bridge solution 79 should contain sufficient potassium chloride to insure saturation at the highest temperatures expected to be encountered. Since the probe is completely sealed, the chemical proportions of the salt bridge solution cannot change due to leakage. Accordingly, the salt bridge solution 63 and 79 in both the reference half cell and the pH sensitive electrode remain fully saturated and even have the same proportions of dissolved salt whenever both solutions are at the same temperature, as they ordinarily will be. In any event, differences between the two solutions will be slight since there will ordinarily be only slight differences in temperature.

The upper end of the glass body 73 of the probe is slidably received within the lower end of the hollow interior of the threaded tubular base member 49. The upper end of the wire conductor 77 connects to the gate terminal of a field effect transistor 81 located within the hollow interior of the base member 49. The drain and source terminals of the field effect transistor 81 are connected to a pair of output leads 83 and 85 that extend from the upper end of the base member 49 for connection to external circuitry. After the connection of the wire conductor 77 and the output leads 83, 85 to the terminals of the field effect transistor 81, liquid potting material is poured into the upper end of the base member 49 to fill the hollow interior of the narrow tube 75 and the upper end of the base member 49. When the potting material hardens, the field effect transistor and its connections are held in place, and the glass stem 73 of the probe is cemented to the base member 49. Potting materials having high dielectric constants should be used so as to insulate the field effect transistor 81 and its connections.

The inclusion of the field effect transistor 81 within the probe structure provides certain unique advantages unavailable in previous pH meters. The temperature of the probe assembly and that of its internal salt bridge solution 79 remain substantially the same as that of the solution of unknown pH with which it is in contact. As the temperature changes, the high resistance of the pH sensitive glass diaphragm 53 also varies. Since the effective input impedance of the field effect transistor 81, that is, the change in the input signal current per unit change in the input signal voltage, is many times greater than the impedance of the glass diaphragm, the internal impedance variation with temperature of the pH sensiitve electrode has negligible effect on the total impedance of the circuit. However, the input signal current, or leakage current as it is commonly referred to, drawn by the gate terminal of the field effect transistor also varies considerably with temperature. Although the absolute value of this leakage current is extremely small, its variation with temperature may produce a noticeable variation in the voltage drop occurring across the glass diaphragm 53 if its impedance remained constant. The rate at which this leakage current changes per unit change in temperature may be termed the temperature coefficient of leakage current. But, the impedance of the glass varies in approximately the same proportion and in the opposite sense so that the voltage drop across the glass diaphragm remains substantially constant and very small compared to the pH signal. For example, the internal resistance of a typical glass electrode is halved with every 6° to 7° C. increase in temperature, while the leakage current of the field effect transistor doubles with an increase of approximately 8° to 9° C. By proper choice of a pH sensitive glass and a field effect transistor, the effects of the temperature variations can be closely paralleled, to reduce substantially or virtually eliminate errors in the pH reading resulting from temperature changes. Although the temperature at the field effect transistor 81 may not be able to follow rapid temperature changes occurring at the diaphragm 53, such rapid temperature changes seldom occur as a practical matter, particularly in process streams. However, the short silver wire of the internal conductor 77 serves as an efficient heat conductor between the solution 79 and the field effect transistor 81, so that, even with rapid temperature changes, the difference in temperature variations between the two points is held to a minimum.

In the alternative, the field effect transistor may be included in circuitry located within a junction box (not shown) closely adjacent the base of the probe, preferably where it will be subjected to substantially the same temperature variations as those occurring in the sample stream. In this case, however, the short output lead from the probe connecting the end of the wire conductor 77 to the gate terminal of the field effect transistor 81 usually must be shielded and properly insulated by a cable to eliminate noise disturbances and errors due to the high impedance circuitry. In any event, the connection between the field effect transistor 81 and the silver-silver chloride wire internal conductor 77 should be kept as short as practicable in order to prevent errors from noise pick up and drift and obviate the need for elaborate and expensive cable connections.

Referring now to FIG. 4, which illustrates schematically a preferred form of single ended amplifier circuit for use in the system in accordance with the invention for continuously measuring or controlling pH, the field effect transistor 81 contained within or closely adjacent to the pH sensitive probe has its gate terminal (G) connected directly to the internal conductor 77 of the pH sensitive probe. The source terminal (S) of the field effect transistor 81 is coupled by the output lead 83 to the non-inverting input terminal of an operational amplifier 89 and through a load resistor 91 to the adjustable output terminal of a potentiometer 92. The output lead 85 connects the drain terminal (D) to the negative terminal of a regulated DC power supply 93, preferably one using Zener diodes or the like to maintain exact voltage values between its negative and positive terminals, and between each of these and a common potential terminal. Typically the field effect transistor 81, such as that sold by Siliconix Incorporated under the identification 2N2606, has an input impedance in excess of $10^{12}$ ohms, which is many times larger than the impedance of the typical glass electrodes.

The silver-silver chloride (or calomel) electrode 67 of the reference half cell is connected by the output lead 69 to the adjustable output terminal on a potentiometer 94, the input terminals of which are connected between negative and common potential. This arrangement permits use of the single ended amplifier arrangement employing only one field effect transistor 81 because the power supply is permitted to float with respect to ground potential and all operating potentials are thus established with reference to the potential of the solution being measured by the reference electrode. A smoothing capacitor 95 connected between the common terminal and ground prevents noise disturbances from producing erratic variations in the operating potentials.

Although single ended amplifier circuits of this type are usually preferred because fewer circuit elements are required, double ended or differential type amplifier circuits that employ two field effect transistors in a preamplifier stage are sometimes more desirable since they permit use of grounded power supplies which are less sensitive to noise disturbances. The extremely small size of field effect transistors permits both to be included easily in the body of the pH sensitive probe. In addition, there presently exist certain modular circuits including both preamplifier and amplifier elements of both the single and double ended type which are integrated in extremely small packages that can easily be fitted into the body of a typical pH sensitive probe.

In the circuit shown, a selected proportion of the output signal from the operational amplifier 89 is fed back to its inverting input terminal through the adjustable output terminal of a potentiometer 96. The amount of negative feedback, and thus the gain of the operational amplifier 89, should be adjusted by the setting of the potentiometer 96 to compensate for observed deviations in the pH sensitivity of the glass diaphragm 53 from the ideal proportionality function predicted by W. Nernst. An appropriate recorder 97 or meter connected between the output of the operational amplifier 89 and common potential is provided to record the pH being measured on an appropriate scale as a function of the output voltage. Where the system is being used to control the pH level of the solution, the control level can be selectively established at a preselected pH by adjustment of the output terminal of a potentiometer 99 to provide a desired reference voltage to the difference amplifier 98 to be compared with the output signal from the operational amplifier 89. The output from the difference amplifier 98 is then used to actuate a control circuit 100 to add acids or bases to adjust the pH of the solution. For example, if the control circuit 100 is to be used for adding acid to keep the pH below a preselected level, the difference amplifier 98 provides an actuating signal to the control circuit 100 for operating an acid pump whenever the output voltage from the operational amplifier 89 exceeds the reference potential.

As shown, the input terminals of the potentiometer 92 are connected between positive and common potential provided by the source 93. The setting of the adjustable output terminal on the potentiometer 92 is selected to establish the particular source-to-drain current through the field effect transistor 81 at which temperature change has least effect on the gain or voltage transfer characteristic. The value of this particular current is readily calculated or determined by test for the particular field effect transistor 81 as the value of source-to-drain current which produces a temperature coefficient of zero for the gate-to-source voltage. The setting on the potentiometer 94, the output terminal of which is connected with the reference cell, is used to adjust the output reading obtained to agree with the known pH of a buffer solution used in standardizing and calibrating the system. Once all adjustments are properly made, no further standardization or calibration is needed for the system, even over prolonged periods of use. As an example, systems built in accordance with the invention can operate unattended for periods of a month or more to measure and control pH in circulating waters systems to an accuracy of 0.1 pH over a control range of from 5.0 to 9.0 pH or more, while providing a repeatability of operation to ±0.025 pH over ambient temperature ranges from 25° to 122° F. Under normal conditions, maintenance is limited to occasional removal of the outer member 11 to wipe clean the glass diaphragm tip 53 of the pH sensitive probe and the inside of the cylindrical flow cell chamber 37, and removal of the plate member 15 to recharge the reference half cell with crystalline potassium chloride salt and distilled water when the level of the undissolved potassium chloride salt becomes low. Also, it may be necessary occasionally every year or more to replace the liquid junction device, but this is easily accomplished by unscrewing the plug 43 and replacing it with another prepared for immediate use as aforementioned. Moreover, the low impedance existing at the output lead of this system permits accurate measurement of pH at remote locations a substantial distance from the metering and control circuitry, and also permits simultaneous or multiplexed measurement of pH at several different locations using only a single meter or recorder. For these reasons, the pH meters and control circuits in accordance with this invention offer significant advantages over prior art devices of this type.

Referring now again to FIG. 4, the signal current drawn by the gate terminal of the field effect transistor 81, commonly termed leakage current, tends to vary with temperature, which as previously mentioned has a complementary effect with the temperature coefficient of resistance of the pH sensitive glass diaphragm 53 when the field effect transistor 81 is subjected to the same temperature changes. However, where the field effect transistor 81 is not in thermal proximity with the glass diaphragm 53, or where its temperature coefficient cannot be closely matched with that of the glass to obtain the desired compensation, the problem of signal current drift with temperature due to variations in leakage current can be remedied by the connection of a reverse biased junction diode 101, or similar junction device such as another field effect transistor, between the gate terminal (G) of the field effect transistor 81 and a selectable positive potential. The diode 101 is carefully chosen to have the same temperature coefficient of leakage current as that exhibited by the field effect transistor 81. Although the absolute value of this current variation is extremely minute, it can result in an undesirable variation in the voltage drop across the high impedance diaphragm 53. However, in the present arrangement, the increase in leakage current at the gate terminal is supplied through the reverse biased diode 101, and no significant change occurs in the voltage drop across the glass diaphragm 53. When the values of the diode 101 and the field effect transistor 81 are selected with care, the operation of this system becomes almost entirely independent of temperature variation over a considerable range.

What is claimed is:

1. A system for determining the pH of a variable solution comprising:
    a pH sensitive electrode, including a high impedance material responsive to the hydrogen ion activity of the variable solution and an internal electrical conductor for generating a voltage at said internal conductor indicative of the pH of the variable solution; and
    a DC amplifier circuit for developing a signal as a function of the voltage developed on said internal conductor, said circuit including a preamplifier stage having a field effect transistor mounted with said electrode and in close proximity to said high impedance material and with its gate terminal connected to said internal conductor to provide a low impedance signal output from its output terminals for transmission to a remote circuit responsive to said low impedance signal output for indicating the pH of the variable solution.

2. The system of claim 1 wherein:
    said field effect transistor is disposed in a heat exchange relationship with said high impedance material that subjects both said field effect transistor and said high impedance material to substantially the same temperature variations.

3. The system of claim 2 further comprising:
    a probe structure engaging said pH sensitive electrode, said field effect transistor being disposed within said probe structure adjacent the pH sensitive electrode, and one end of said internal conductor being connected directly to the gate terminal of said field effect transistor.

4. The system of claim 1 wherein:
    a semiconductor junction device is connected in its reverse bias direction to the gate terminal of said field effect transistor, said junction device having a temperature coefficient of current leakage corresponding to the temperature coefficient of current leakage for said field effect transistor and being disposed in a common temperature environment with said field effect transistor.

5. The system of claim 1 further comprising:
    a reference half cell for measuring the potential of said solution, said reference half cell including an internal conductor of the same material as said internal conductor of said pH sensitive electrode, a fully saturated salt bridge solution containing an excess of undissolved crystalline salt, a sealed chamber enclosing said salt bridge solution and said undissolved salt, and a liquid junction device having substantial cross-sectional area with numerous capillaries therethrough extending between said chamber and said variable solution capable of being permeated by said salt bridge solution and said variable solution for providing ion exchange contact therebetween; and
    wherein said pH sensitive electrode contains a fully saturated salt bridge solution having a chemical composition similar to the salt bridge solution contained within said reference half cell to establish electrolytic contact between said high impedance material and said internal conductor.

6. The system of claim 5 wherein:
    the liquid junction device consists of a short wooden dowel having a diameter of at least in the order of 0.25 inch capable of being permeated with said salt bridge solution and said solution the pH of which is being determined.

7. The system of claim 5 wherein:
said liquid junction device consists of a short column of porous ceramic material having a diameter of at least in the order of 0.25 inch capable of being permeated by said salt bridge solution and by the solution the pH of which is being measured.

8. The system of claim 1 wherein:
said field effect transistor is operated with its drain-to-source bias current at the level where the gain characteristic is independent of temperature variation over an ambient temperature range.

9. In a system for continuously measuring the pH of a circulating solution, the flow cell comprising:
a flow chamber having inlet and outlet openings through which the circulating solution passes;
a pH sensitive electrode having a diaphragm of pH sensitive material at its tip, said electrode being disposed within said flow chamber with its tip immersed in said circulating solution,
a sealed reference half cell chamber containing a fully saturated salt bridge solution with an excess of undissolved electrolytic salt crystals immersed therein; and
a liquid junction device for establishing ion exchange contact between said circulating solution and said salt bridge solution within said reference half cell chamber, said liquid junction device consisting of a column of porous material having a substantial cross-sectional area, capable of being permeated by said circulating solution and said salt bridge solution.

10. The flow cell of claim 9 wherein said liquid junction device consists of a short wooden dowel of substantial cross-sectional area having a diameter of at least in the order of 0.25 inch.

11. The flow cell of claim 9 wherein:
said liquid junction device comprises a short column of porous ceramic material of substantial cross-sectional area having a diameter of at least in the order of 0.25 inch.

12. In a system for measuring the pH of a circulating solution, an arrangement comprising:
a pH sensitive electrode including a material responsive to the hydrogen ion activity of the circulating solution for developing a voltage indicative thereof, a hollow insulating member mounting said material for immersion in said circulating solution, an internal conductor, and a salt bridge solution contained within the hollow insulating member for establishing electrolytic contact between said material and said internal conductor; and
an amplifier circuit responsive to the voltage on said internal conductor, said amplifier circuit having a field effect transistor attached to and in close proximity with the insulating member and having its gate electrode connected to said internal conductor and its source and drain terminals connected to provide a low impedance signal indicative of the pH of the circulating solution for transmission to a remote location.

13. The arrangement of claim 12 wherein:
said amplifier circuit includes circuit means connected to the drain and source terminals of said field effect transistor for operating said field effect transistor as a unity gain amplifier.

14. The arrangement of claim 13 wherein:
said circuit means is disposed at a location remote from said pH sensitive electrode and further includes output leads connecting the drain and source terminals of said field effect transistor to said circuit means at said remote location.

15. The arrangement of claim 14 wherein:
said amplifier circuit further includes a variable gain operational amplifier connected to amplify the low impedance signal from said circuit means indicative of the pH of the circulating solution;
means including a difference amplifier for comparing the amplified output signal from said operational amplifier with a predetermined voltage level indicative of a desired pH level; and
a control means responsive to said comparison for varying the pH of the solution to maintain said desired pH level.

References Cited

UNITED STATES PATENTS

| | | | |
|---|---|---|---|
| 2,108,293 | 2/1938 | Perley. | |
| 2,387,727 | 10/1945 | Godshalk | 324—30 X |
| 2,607,718 | 8/1952 | Suthard | 324—30 X |
| 2,560,857 | 7/1951 | Gambetta | 324—30 |
| 2,846,386 | 8/1958 | Ingruber | 204—195 |
| 3,264,205 | 8/1966 | Leonard et al. | 204—195 |
| 2,886,771 | 5/1959 | Vincent | 324—30 |
| 3,216,915 | 11/1965 | Arthur et al. | |
| 3,281,348 | 10/1966 | Schumacher et al. | 324—30 X |

OTHER REFERENCES

A. V. J. Martin: Electronics, vol. 36, June 14, 1963, pp. 56 and 58.

Electronic Design, vol. 11, April 26, 1936, p. 68 of pp. 66–69.

Electronic Design, vol. 14, No. 3, Feb. 1, 1966, pp. 66–68 of pages 64–68.

RUDOLPH V. ROLINEC, *Primary Examiner.*

C. F. ROBERTS, *Assistant Examiner.*

U.S. Cl. X.R.

23—253; 204—196; 324—123; 330—38